Aug. 19, 1958     J. F. McDONALD     2,848,671
MOTOR-SYNCHRONIZING CIRCUIT
Filed Jan. 17, 1955
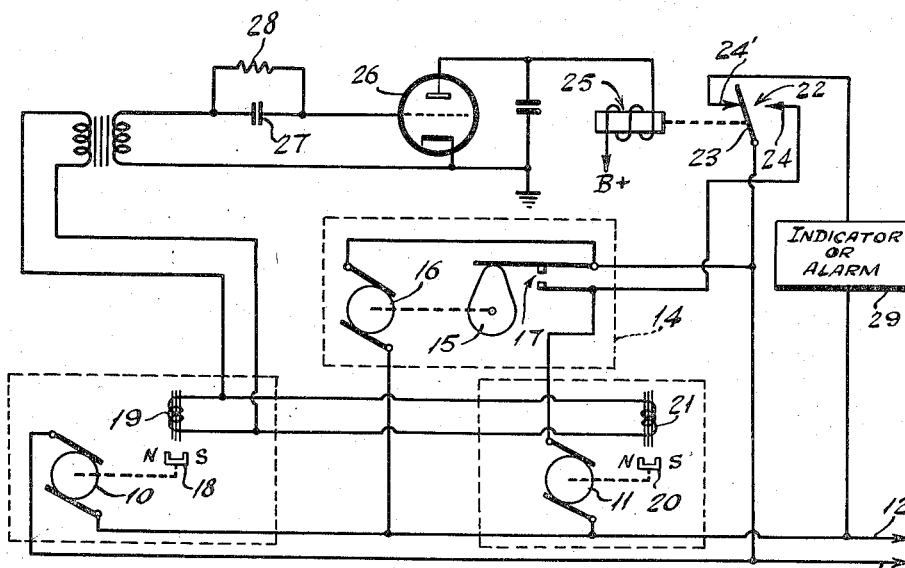
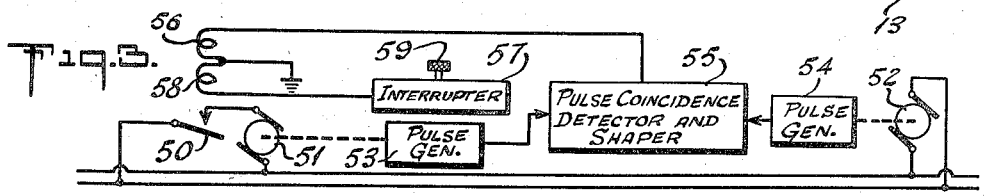
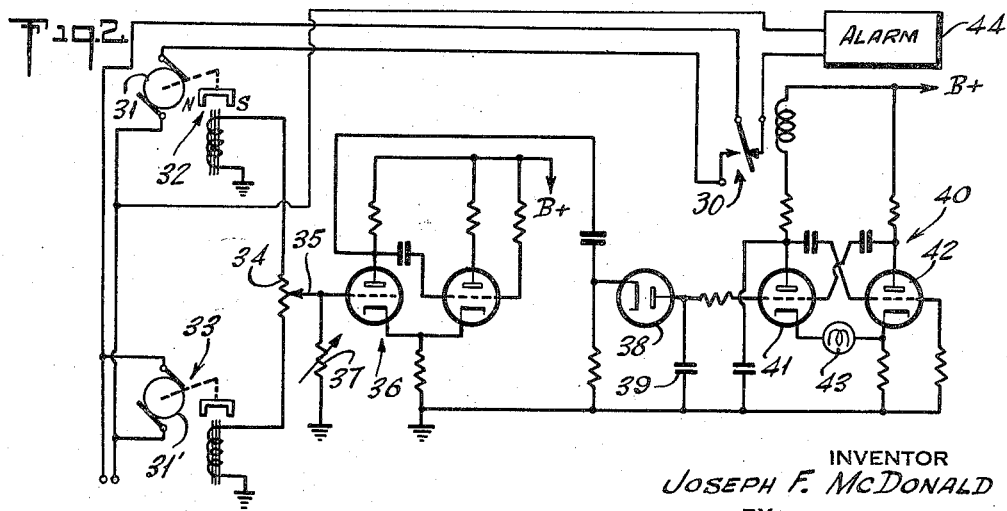
INVENTOR
JOSEPH F. McDONALD
BY
*Mitchell & Bechert*
ATTORNEYS

United States Patent Office 2,848,671
Patented Aug. 19, 1958

2,848,671

MOTOR-SYNCHRONIZING CIRCUIT

Joseph F. McDonald, New Hyde Park, N. Y., assignor to Servo Corporation of America, New Hyde Park, N. Y., a corporation of New York Application January 17, 1955, Serial No. 481,996

9 Claims. (Cl. 318—72)

My invention relates to a synchronizing circuit for use with two or more synchronous motors operating from the same frequency source.

It is an object of the invention to provide improved means of the character indicated.

It is another object to provide a motor-synchronizing circuit which may be responsive to an out-of-phase running relation of two synchronous motors and which will automatically transiently disconnect and connect one motor so as to allow phase-retardation thereof, so that, until cophasal operation is established, the mechanism will continuously attempt to establish cophasal operation.

It is another object to provide a motor-synchronizing circuit with means responsive to cophasal operation of two or more motors for holding-in the connections to all motors, there being provision for briefly interrupting the supply to an out-of-phase motor to allow phase-retardation thereof in an effort to establish cophasal operation.

It is a further object to achieve the above objects with a circuit of such inherent simplicity that synchronizing data may be readily transmitted over a telephone line or radio link in order to establish cophasal operation of remotely located motors.

It is a general object to achieve the above objects with a minimum use of mechanically moving parts and specifically avoiding the use of sliding contacts or cam-operated switches in order to obtain synchronizing data from the rotors of the individual motors.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is an electrical diagram schematically illustrating one embodiment of the invention; and Figs. 2 and 3 are similar diagrams illustrating further embodiments.

Briefly stated, my invention contemplates the automatic cophasal operation of two synchronous motors operating from the same frequency source or from sources standardized to the same frequency. The successful operation of the circuit is based on the characteristic of a reluctance-type synchronous motor to "lock-in" at any one of several discrete positions; for a 4-pole motor, there are four characteristic lock-in positions. With the possibility of lock-in at any one of several positions, there is ambiguity as to the mechanical phase of the rotors of the individual synchronized motors, and my synchronizer operates automatically to establish mechanical cophasal synchronous operation of the motors.

My synchronizer relies on the use of separate pulse generators driven by each of the motors and generating short pulses characteristically identified with corresponding unique angular positions of the motors. Upon pulse coincidence (for pulses generated by the respective generators), meaning cophasal operation, all supply connections to the motors are maintained; thus, once cophasal operation is established, there need be no interruption of cophasal operation. If, however, initial lock-in does not establish cophasal operation, the means responsive to pulse coincidence cannot be operative, and I provide additional means for connecting and disconnecting one of the motors with an intermittent period sufficient to allow phase-retardation to the next lock-in position, for each interruption of supply to one motor. Cophasal operation is bound to result either upon the first attempt to connect the motors in synchronism, or on one of but a few successive phase-retarded attempts at cophasal lock-in.

Referring to Fig. 1 of the drawing, my invention is shown in application to two synchronous motors 10—11 having connections 12—13 to the same frequency source or to separate frequency sources standardized to the same frequency. The connections 12—13 continuously energize the motor 10, but provision is made for interrupting the supply of control potential to the motor 11. In the form shown, the interrupter 14 is mechanical, comprising a cam 15 continuously driven by a motor 16 and serving periodically to break and to close contacts 17, in series relation with the supply to motor 11. The period of interruption determined by cam 15 is preferably so related to the speed and drag characteristics of the motor 11 as to allow substantially one or an odd-integer number of phase-retardations of motor 11, for each interruption determined by cam 15. The device 14 thus provides a means for effectively continuously running motors 10—11 with brief periods of lock-in of motor 11 at each of the possible lock-in positions thereof with respect to the motor 10, the phase-retardation being stepped for each operation of switch 17.

One of the lock-in positions of motor 11 with respect to motor 10 will represent cophasal operation of the two motors, and therefore I provide means in addition to the stepping mechanism 14 for holding-in the supply of potential to motor 11 upon attainment of cophasal operation. In the form shown, cophasal operation is determined by employment of separate pulse generators driven by the separate motors. For the case of motor 10, the pulse generator comprises a driven magnetic element 18, which passes a stationary magnetic element or pick-up 19 once for each revolution of the motor 10. In like manner, the pulse generator for motor 11 comprises movable and fixed elements 20—21. The angular positions at which the respective generators will generate pulses are set to coincide for the desired mechanical cophasal operation of the motors, so that if pick-ups 19 and 20 simultaneously develop pulses, the motors are operating synchronously and cophasally.

In order to hold-in the supply of potential to motor 11 as long as coincident pulses are developed by generators 19—21, I provide further switch means 22 having an armature 23 and a stationary contact 24 in parallel with the switch means 17. A solenoid 25 may hold armature 23 away from contact 24 unless pulse coincidence is detected, and for this purpose, means responsive to lack of pulse coincidence assures application of energizing potential to solenoid 25, holding the switch 22 in the position shown.

The means responsive to pulse coincidence may include a grid-leak detector 26, set to conduct in the absence of pulse coincidence. Upon pulse-coincidence, detector 26 is driven below cut-off to de-energize solenoid 25, thereby allowing armature 23 to keep the motor-control circuit closed at contact 24. The arrival of coincident pulses will be recognized by double-amplitude voltages applied to the control electrode of tube 26, and only voltages of this magnitude can drive tube 26 to cut-off. Therefore, for non-coincident pulses, tube 26 will remain conducting so as to avoid completion of the motor hold-in circuit.

The input to tube 26 preferably includes means 27 for accumulating a charge for all incoming pulses, and the leakage effected by a resistor 28 shunting the storage means 27 is preferably at a slow enough rate to assure cut-off of tube 26 for substantially a full revolution of motors 10—11 at synchronous speed. Thus, for every cophasal synchronous revolution of the motors 10—11, a new coincident pulse will recharge capacitor 27, and tube 26 may be kept continuously cut-off.

In operation, the circuit of Fig. 1 is started by connecting the frequency source or the standardized frequency sources to the two motors 10—11; the particular supply to motor 16 is not critical or important, but it may conveniently be run from the same source as motors 10—11. When the motors lock in, they will be either cophasal or out of phase. If cophasal, the coincident pulses will cut off tube 26, and the hold-in relay 22 will maintain the supply connections regardless of the function of the interrupter 14. If, however, the motors lock-in for an out-of-phase relation, tube 26 will conduct so as to disconnect the hold-in relay 22 and to allow interrupter 14 to control the stepped phase-retarded lock-in of motor 11 (with respect to motor 10) until such time as coincident pulses are generated at 19—21. If desired, indicator or alarm means 29 may operate from contact 24' of relay 22 to warn of the existence of an out-of-phase relation.

In Fig. 2, I show a modification employing but a single relay or switch 30 to determine the connected or disconnected relation of the motor 31, to be synchronized cophasally with the motor 31'. The pulse generators 32—33 associated with the respective motors may be as described for motors 10—11 in Fig. 1, and the outputs of these generators are summed across a resistor 34; resistor 34 may have an adjustable pick-off connection 35, whereby correction may be made to establish proper magnitude evaluation of the pulses generated by the respective generators 32—33. The summed pulses are applied to a driven multivibrator 36, so adjusted as to trigger only upon arrival of a large pulse, representing pulse coincidence (i. e. cophasal operation); the function of multivibrator 36 is to produce a suitably shaped pulse of shorter duration than one revolution of the motors at synchronous speed. This pulse is rectified by a diode 38 to produce a voltage across a capacitor 39, in controlling relation with a free-running multivibrator 40 comprising the two sections 41—42. For the arrangement shown, and in the absence of arrival of an incoming pulse, the left section 41 of multivibrator 40 is conductive, thus establishing the supply of energizing potential to the solenoid for relay 30; the motor-controlling side of relay 30 is shown to be open when its solenoid is energized. If desired, an indicator light 43 may be placed in series with this solenoid circuit, as in the cathode circuit for tube 41, to indicate that the motors are not operating cophasally.

The adjustment of multivibrator 40 is preferably such that, when conducting in the phase described, namely, with the left section 41 conducting, a period will be allowed sufficient for a one-pole retardation of motor 31 with respect to motor 31', whereupon multivibrator 40 will change its state so as to cut off section 41 and to render section 42 conductive for a period of time at least sufficient to permit lock-in. If cophasal operation of the motors is achieved for the first phase-retarded lock-in, then a coincident pulse will pass multivibrator 36 for application of a cut-off charge at 39, so as to assure prolonged cut-off of multivibrator section 41; if, however, cophasal operation is not achieved for the first retarded lock-in, then multivibrator 40 will automatically recycle in the manner described until lock-in is achieved. If desired, there may be provided, in addition to the indicator 43, alarm means 44 responsive to an operation of relay 30 and, therefore, to the absence of cophasal operation.

In Fig. 3, I show a further modification, again employing a single switch means 50 in controlling relation with one of the motors 51 of two or more motors 51—52 to be synchronized. As distinguished from the other two forms described above, the arrangement of Fig. 3 provides independent means for actuating the single switch means 50. The means responsive to a locked-in cophasal relation may be as previously described, namely, pulse generators 53—54 driven by the respective motors and supplying pulses to a coincidence detector and shaper 55. The means 55 is shown connected to one (56) of the independent means for actuating switch 50 in the closing direction. The arrangement is such that if coincident pulses occur, switch 50 will be actuated (by means 56), but if coincident pulses do not occur, there will be no actuation of switch 50 by reason of pulse-generator operation. In order to provide progressive phase retardation, I show interrupter means 57 connected to the other means (58) for independent closing actuation of switch 50. The interrupter 57 may be of the mechanical variety discussed at 14 or of the free-running multivibrator variety discussed at 40 and may include manual means 59 for adjusting the interruption period thereof, appropriate to the speed and drag characteristics of the motor 51.

The manual means 59 may, on the other hand, be understood to suggest completely manual operation of the interrupter 57; for example, means 57 may be viewed as means for normally applying an energizing potential to winding 58, with provision for a manual push-button or the like operation to cut off the supply of such energizing potential. Upon release of the push-button, energizing potentials are re-established, but, depending upon the duration of push-button operation, one or more pole-retardations will have taken place at motor 51. Release of the push-button will enable motor 51 to lock-in for another phase relation which, after one or more push-button operations, may represent cophasal operation of the two motors.

It will be seen that I have described relatively simple means for assuring cophasal operation of two synchronous motors which may be located remotely from each other. My arrangement is such that regardless of the form employed, synchronizing signals are of the simplest possible variety and may be readily accommodated on standard communication links. It is not necessary that the two or more separated motors be operated from the same source, but merely that they be operated from sources standardized to the same frequency. For purposes of discussion herein, reference has been made to energizing from the same source, but such language in the specification and claims will be understood to contemplate also independent sources that are frequency-standardized, and basically controlled from a single source, in the ultimate sense of the word.

While I have described the invention in detail for the preferred forms illustrated, it will be understood that modifications may be made within the scope of the invention as defined in the claims which follow.

I claim:

1. In combination, two synchronous motors having connections for supply by a common source, two switches in parallel relation with each other and in controlling relation with one of said motors, separate pulse generators driven by each of said motors and generating separate pulses characteristically identified with corresponding unique angular positions of said motors, means responsive to coincidence of said pulses and controlling one of said switches to maintain the connection to said one motor, and intermittently operative means controlling intermittent closed and open conditions of the other of said switches.

2. In combination, two synchronous motors having connections for supply by a common source, switch means in series relation with the connection to one of said motors, intermittently operative means controlling intermittent closed and open conditions of said switch means for intermittently completing and breaking the connection to said one motor, and hold-in means for said switch means and responsive to synchronized operation of said motors.

3. In combination, two synchronous motors having connections for supply by a common source, switch means in series relation with the connection to one of said motors, intermittently operative means controlling intermittent closed and open conditions of said switch means for intermittently completing and breaking the connection to said one motor, separate pulse generators driven by each of said motors and generating separate pulses characteristically identified with corresponding unique angular positions of said motors, and hold-in means for said switch means and responsive to coincidence of said pulses to hold a completed connection to said one motor.

4. In combination, two synchronous motors having connections for supply by a common source, two like separate pulse generators driven respectively by each of said motors and generating separate pulses identified with corresponding single angular orientations of said motors, means responsive to non-coincidence of pulses generated by said generators and effective to disconnect one motor from the supply, periodically operative means for intermittently reconnecting said one motor to the supply and for disconnecting the same for a period of time sufficient to allow substantially a one-phase retardation of the rotation thereof, said last-defined means reconnecting said one motor upon lapse of said period of time, whereby the cycle of connection and disconnection of said one motor will automatically repeat until said motors are driven in synchronism.

5. The combination of claim 4, in which said means responsive to non-coincidence of pulses includes a relay continuously energized in the absence of pulse coincidence, and means responsive to pulse coincidence for de-energizing said relay.

6. The combination of claim 4, in which said periodically operative means includes a continuously running motor-driven cam-operated switch, the period of opening and closing of said switch being of the order of magnitude of said period of time.

7. The combination of claim 2, in which said intermittently operative means includes a free-running multivibrator having a time constant for one phase of its operation substantially equivalent to a period of time allowing substantially a one-phase retardation of the rotation of said one motor.

8. The combination of claim 2, in which said switch means comprises relay means controlling the supply connection to one of said motors, two independent windings for controlling the closed condition of said relay means, said intermittently operative means including an interrupter connected to one of said windings, separate pulse generators driven by each of said motors and connected to the other of said windings, the response of said relay means being such as to close upon coincidence of pulses supplied by said pulse generators and to fail to close when said second winding is energized by non-coincident pulses.

9. The combination of claim 2, in which said switch means comprises relay means controlling the supply connection to one of said motors, said hold-in means comprising separate pulse generators driven by each of said motors and generating separate pulses characteristically identified with corresponding unique angular positions of said motors, pulse-shaping means responsive to coincidence of said pulses and connected in controlling relation with said relay means, said shaping means developing an elongated pulse of substantially the duration of one rotation of a motor at synchronous speed upon occurrence of each pulse coincidence, whereby said relay means may maintain supply connections to said one motor as long as coincident pulses are generated for each motor revolution.

References Cited in the file of this patent

UNITED STATES PATENTS

| 2,228,079 | Gulliksen | Jan. 7, 1941 |
| 2,322,985 | Wegener | June 29, 1943 |
| 2,352,050 | Wegener | June 20, 1944 |
| 2,406,853 | Richardson et al. | Sept. 3, 1946 |

FOREIGN PATENTS

| 542,688 | Great Britain | Jan. 22, 1942 |